Patented Feb. 7, 1928.

1,658,285

UNITED STATES PATENT OFFICE.

KENNETH COX AND PERCIVAL JOHN McDERMOTT, OF MANCHESTER, ENGLAND, ASSIGNORS TO REFINERS LIMITED, OF MANCHESTER, ENGLAND, A BRITISH COMPANY.

PURIFICATION OF BENZOL, PETROL, AND THE LIKE.

No Drawing. Application filed February 25, 1926, Serial No. 90,682, and in Great Britain January 12, 1926.

This invention relates to the purification of benzol, petrol and like oils and spirits by the removal therefrom of sulphurous, resinous and other undesirable impurities, and by the polymerization of undesirable unsaturated hydrocarbons.

By research and experiment, we have found that if during the distillation of the oils or spirits, there be added to the charge in the still ferric sulphate or persulphate of iron $Fe_2(SO_4)_3$ which is unstable in the presence of the aforesaid undesirable impurities at the elevated temperature present in the still, and which disintegrates, giving rise to compounds possessing a reduced acid action and serving to break down the said impurities, and if the distillate be then washed or otherwise treated with alkali, then a pure clear oil or spirit results, particularly suitable for use in internal combustion engines. We have further found that the purification is improved by the mixture with the said chemical body of a microporous material such as fuller's earth.

Our invention comprises the treatment of the oil or spirit to be purified with ferric sulphate or per-sulphate of iron $Fe_2(SO_4)_3$ which is placed in the still or in a digester with reflux condenser so that the oil or spirit is heated in the presence of the said material and the subsequent treatment of the distillate with an alkali.

Our invention further comprises the treatment with a mixture containing ferric sulphate and a microporous material.

In one convenient application of our invention, we add a mixture of ferric sulphate $Fe_2(SO_4)_3$ in combination with a microporous material such as fuller's earth to the charge of benzol, petrol or the like in the still, and distil the spirit off in the usual manner.

Owing to the instability of ferric sulphate at elevated temperatures in the presence of the impurities in the oil or spirit, it disintegrates and gives rise to compounds possessing the correct degree of acidity, or other chemical activity, necessary to combine with the undesirable constituents in the oil or spirit involving their entire precipitation, without affecting the stable part of the oil or spirit which it is desired to isolate. The micro-porous materials act in the known manner to absorb some of the sulphurous and resinous impurities and assist in the polymerization of undesirable unsaturated hydrocarbons. They also by their presence alone act to prevent the formation of a tar of such a viscous nature as to render its removal from the still a difficult matter.

The distillate is afterwards washed with a weak alkaline solution such as caustic soda or the like or filtered through an alkaline material such as lime.

We claim:—

1. In the purification of benzol, petrol and like oils and spirits, distilling the same with ferric sulphate $Fe_2(SO_4)_3$ which is unstable at an elevated temperature in the presence of the impurities in the oil or spirit, and which then disintegrates and breaks down the impurities, and treating the distilled oil or spirit with alkali.

2. In the purification of benzol, petrol and like oils and spirits, distilling the same in the presence of persulphate of iron $Fe_2(SO_4)_3$ and a microporous material and treating the distillate to neutralize its acidity.

In testimony whereof we have signed our names to this specification.

PERCIVAL JOHN McDERMOTT.
KENNETH COX.